United States Patent
Bartley et al.

(10) Patent No.: US 8,332,659 B2
(45) Date of Patent: Dec. 11, 2012

(54) SIGNAL QUALITY MONITORING TO DEFEAT MICROCHIP EXPLOITATION

(75) Inventors: Gerald K Bartley, Rochester, MN (US);
Darryl J Becker, Rochester, MN (US);
Paul E Dahlen, Rochester, MN (US);
Philip R Germann, Oronoco, MN (US);
Andrew B Maki, Rochester, MN (US);
Mark O Maxson, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 531 days.

(21) Appl. No.: 12/181,352

(22) Filed: Jul. 29, 2008

(65) Prior Publication Data

US 2010/0031375 A1 Feb. 4, 2010

(51) Int. Cl.
*G06F 21/00* (2006.01)
(52) U.S. Cl. .......................................... 713/193; 713/194
(58) Field of Classification Search .................. 713/164, 713/165, 166, 167, 193, 194, 189, 187; 726/34, 726/35, 36
See application file for complete search history.

(56) References Cited

U.S. PATENT DOCUMENTS

| | | | |
|---|---|---|---|
| 4,146,752 A | 3/1979 | Konig | |
| 4,288,829 A | 9/1981 | Tango | |
| 5,117,457 A | 5/1992 | Comerford et al. | |
| 5,177,352 A | 1/1993 | Carson et al. | |
| 5,389,738 A | 2/1995 | Piosenka et al. | |
| 5,675,319 A | 10/1997 | Rivenberg et al. | |
| 5,790,670 A | 8/1998 | Bramlett | |
| 5,861,652 A | 1/1999 | Cole et al. | |
| 5,889,306 A | 3/1999 | Christensen et al. | |
| 6,121,659 A | 9/2000 | Christensen et al. | |
| 6,264,108 B1 | 7/2001 | Baentsch | |
| 6,396,400 B1 | 5/2002 | Epstein, III et al. | |
| 7,005,733 B2 | 2/2006 | Kommerling et al. | |
| 7,362,248 B2 | 4/2008 | McClure et al. | |
| 7,555,787 B2 | 6/2009 | Clercq | |
| 2001/0033012 A1 | 10/2001 | Kommerling et al. | |
| 2002/0002683 A1* | 1/2002 | Benson et al. | 713/194 |
| 2002/0007459 A1 | 1/2002 | Cassista et al. | |
| 2002/0199111 A1* | 12/2002 | Clark et al. | 713/194 |
| 2005/0151777 A1 | 7/2005 | Silverbrook | |
| 2005/0218401 A1 | 10/2005 | Marinet et al. | |
| 2005/0274630 A1 | 12/2005 | Clark et al. | |
| 2005/0275538 A1 | 12/2005 | Kulpa | |
| 2006/0028340 A1 | 2/2006 | Hooghan et al. | |
| 2006/0081497 A1 | 4/2006 | Knudsen | |
| 2006/0157803 A1 | 7/2006 | Chow et al. | |
| 2007/0029384 A1 | 2/2007 | Atherton | |
| 2008/0000988 A1 | 1/2008 | Farooq et al. | |

(Continued)

OTHER PUBLICATIONS

U.S. Appl. No. 12/181,342, Notice of Allowance dated Jan. 26, 2011, (12 pgs).

(Continued)

*Primary Examiner* — Gilberto Barron, Jr.
*Assistant Examiner* — Izunna Okeke
(74) *Attorney, Agent, or Firm* — Toler Law Group

(57) ABSTRACT

Method and apparatus and associated method of detecting microchip tampering may include a conductive element in electrical communication with multiple sensors for verifying that signal degradation occurs at an expected region of the conductive element. A detected variance from the expected region may automatically trigger an action for impeding an integrated circuit exploitation process.

19 Claims, 2 Drawing Sheets

U.S. PATENT DOCUMENTS

| | | | |
|---|---|---|---|
| 2008/0258754 | A1 | 10/2008 | Dillon et al. |
| 2008/0260150 | A1 | 10/2008 | De Clercq |
| 2009/0146270 | A1 | 6/2009 | Buer et al. |
| 2010/0026313 | A1 | 2/2010 | Bartley et al. |
| 2010/0026506 | A1 | 2/2010 | Bartley et al. |
| 2010/0031064 | A1 | 2/2010 | Walmsley |
| 2010/0090714 | A1 | 4/2010 | Van Geloven et al. |

OTHER PUBLICATIONS

Berrie, The Practical Engineer—The defensive design of printed-circuit boards, Sep. 1999, IEEE Spectrum, vol. 36, Issue 9, (pp. 76-81).

U.S. Appl. No. 12/181,387, Non-Final Office Action dated Feb. 28, 2011, (9 pgs).

Chinchani et al., A Tamper-Resistant Framework for Unambiguous Detection of Attacks in User Space Using Process Monitors, 2003, IEEE, (10 pgs).

U.S. Appl. No. 12/181,357, Non-Final Office Action dated Jan. 20, 2011,(11 pgs).

U.S. Appl. No. 12/181,357, Final Office Action dated Jul. 1, 2011, (9 pgs).

U.S. Appl. No. 12/181,401, Non-Final Office Action dated Aug. 3, 2011, (12 pgs).

U.S. Appl. No. 12/181,387, Final Office Action dated Aug. 15, 2011, (10 pgs).

* cited by examiner

SIGNAL QUALITY MONITORING TO DEFEAT MICROCHIP EXPLOITATION

FIELD OF THE INVENTION

The present invention relates generally to microchip technologies, and more particularly, to protecting the circuitry and content of microchips.

RELATED APPLICATIONS

The present application relates to co-pending U.S. patent applications entitled "Capacitance-Based Microchip Exploitation Detection" (U.S. application Ser. No. 12/181,342), "False Connection for Defeating Microchip Exploitation" (U.S. Pat. No. 7,701,244), "Interdependent Microchip Functionality for Defeating Exploitation Attempts" (U.S. application Ser. No. 12/181,376), "Capacitance Structures for Defeating Microchip Tampering" (U.S. Pat. No. 7,884,625), "Resistance Sensing for Defeating Microchip Exploitation" (U.S. application Ser. No. 12/181,387), "Continuity Check Monitoring for Microchip Exploitation Detection" (U.S. application Ser. No. 12/181,357), and "Doped Implant Monitoring for Microchip Tamper Detection" (U.S. application Ser. No. 12/181,401), all of which are filed concurrently herewith and which are incorporated by reference in their entireties.

BACKGROUND OF THE INVENTION

Protecting microchip technology deployed in the field is an enormous concern in both military and commercial sectors. Microchips and related devices are routinely acquired by motivated competitors and governments seeking to reverse engineer or otherwise learn the functionality of the technology. Such information is used to make a technological leap in their own devices, or may be used to exploit a perceived weakness in the examined equipment. Sophisticated government and commercial entities thus possess ample strategic and economic motivation to reverse engineer microchip components.

A microchip, or integrated circuit, is a unit of packaged computer circuitry that is manufactured from a material, such as silicon, at a very small scale. Microchips are made for program logic (logic or microprocessors) and for computer memory (Random Access Memory or other memory microchips). Microchips are also made that include both logic and memory, and for special purposes, such as analog-to-digital conversion, bit slicing and gateways.

An advanced method of reverse engineering select microchip components uses high energy photons, electrons or ions. Focused ion beam processes excite active portions of a microchip to observe how other portions are affected. When used to reverse engineer, these processes are typically done while the microchip is in a powered-on state in order to observe the functionality of the microchip.

Microchip designers in the aerospace, defense and commercial industries routinely implement software and other logic-related techniques to confuse and thwart attempts to probe the active side of the component. For example, safeguard measures integrated within microchips hinder reverse engineering techniques. Microchip designers capitalize on the powered on status required by a reverse engineering process to incorporate a self-destruct or obstructing mechanism into the microchip. The mechanism is triggered by the detection of tampering. When tampering is detected, the power in the circuit is diverted to microchip annihilation or another predetermined measure.

Microchip designers occasionally impede the reverse engineering processes by additionally plating the back of the bulk silicon with a metal layer. While intact, this layer obstructs both the insertion of ions and electrons, and the observation of photons.

While these safeguards provide some protection, motivated exploiters have developed ingenious ways of analyzing the microchip without triggering the safeguard mechanisms. Despite the precautions, the backside of the microchip remains vulnerable to inspection by photons, focused ion beam, or even simple infrared observation. Sophisticated exploitation techniques overcome conventional obstacles by removing the bulk silicon and metallized back layer. For instance, reverse engineering processes may grind away the metallized portion towards implementing a successful focused ion beam operation. In this manner, microchip information may be exploited in a manner that does not initialize a self-destruct feature.

Consequently what is needed is an improved manner of detecting tampering of a microchip.

SUMMARY OF THE INVENTION

The present invention provides an improved computer implemented method, apparatus and program product for protecting security sensitive circuitry of a microchip from undesired analysis by providing, in part, a conductive element proximate security sensitive circuitry of a microchip and configured to conduct an electrical signal that predictably weakens as it propagates through the conductive element. Aspects of the invention also include circuitry comprising a sensor in electrical communication with the conductive element and configured to initiate an action for obstructing analysis of the security sensitive circuitry in response to the unpredictable weakening of the electrical signal. The circuitry may further be configured to detect the unpredictable weakening of the electrical signal. Electrical communication may include a physical connection, a sequence of physical and/or remote connections, or merely a proximity within which an electrical property may be detected.

According to an embodiment consistent with the underlying principles of the present invention, the electrical signal may predictably weaken at different regions along the conductive element according to a variable signal strength of the electrical signal. The circuitry may be configured to automatically vary the signal strength of the electrical signal.

Another aspect of the invention may include a signal transmitter configured to transmit the electrical signal to the conductive element. An embodiment consistent with the invention may include a connection between the sensor and the conductive element. The connection may comprise a through-silicon via. The electrical signal may predictably weaken around a point or range of points along the conductive element.

An aspect of the invention may include program code executed by the circuitry and configured to initiate the action for obstructing analysis of the security sensitive circuitry in response to the unpredictable weakening of the electrical signal. The embodiment may include computer readable medium bearing the program code.

According to another aspect of the invention, the conductive element may comprise a metallic coil, path or plate. The action may include a shutdown, spoofing or self-destruct operation, among others.

Another embodiment consistent with the invention may include a conductive element proximate security sensitive circuitry of a microchip and configured to conduct an electrical signal, wherein the electrical signal predictably weakens as it propagates through the conductive element according to a strength of the electronic signal. Circuitry may comprise a plurality of sensors in electrical communication with the conductive element and be configured to set the strength of the electronic signal. The circuitry may further be configured to initiate an action for obstructing analysis of the security sensitive circuitry in response to the electronic signal unpredictably weakening.

Another aspect of the invention may include a method of protecting security sensitive circuitry of a microchip from undesired analysis, the method comprising sensing an unexpected weakening of an electronic signal propagating through a conductive element proximate security sensitive circuitry of a microchip, and initiating an action configured to obstruct analysis of the security sensitive circuitry in response to sensing the unexpected weakening of the electronic signal.

An embodiment consistent with the invention may include multiple sensors positioned along the conductive element. The weakening of the signal may occur around a point or range of points along the conductive element. Aspects of the invention may vary a strength of the electronic signal to vary an area of the conductive element at which the electronic signal is expected to weaken. The action to protect the security sensitive circuitry of the microchip may include a shutdown, spoofing and/or a self-destruct operation.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments of the invention.

DETAILED DESCRIPTION

Embodiments consistent with the underlying principles of the present invention include a conductive element in electrical communication with multiple sensors for verifying that signal degradation occurs at an expected region of the conductive element. A detected variance from the expected region may automatically trigger an action for impeding an integrated circuit exploitation process.

Embodiments consistent with the invention include a sensing structure that may decrease the likelihood of a successful reverse engineering attempt that includes grinding down a metallized layer on the backside of a microchip. Embodiments may use multiple through-silicon vias connected to an array of receivers and positioned along a copper coil or other conductive element.

The conductive element may be attached to the back of the bulk silicon. As such, the sensing structure comprising the coils, vias and receivers may allow for the efficient detection of a reverse engineering attempt. Aspects consistent with the invention enable the microchip to accurately detect when the copper is removed or replaced, as will typically occur as a step in a reverse engineering process.

An embodiment consistent with the invention senses the signal quality along different locations of a copper coil. The system may verify that signal quality at a region in the coil degrades to a point where the receive circuitry can no longer sense the signal, or the signal has diminished to a preset level.

Where so configured, the copper coil or other conductive element may be created on the backside of the microchip. Through-silicon vias may be attached at different locations along the coil. The vias may provide connections to receivers inside the microchip. A pulse may be sent down the coil at a specific location. The array of receive circuitry may then sense the signal at the different locations down the trace. Eventually, the signal quality should get to a point where the receivers are unable to detect the signal. This degradation may create a region along the trace where the signal failure should occur. Logic present within or in communication with the microchip may determine if the signal is failing in the correct region. In one example, digital logic may sense each receiver output and compare it to expected results.

Another embodiment may selectively vary the driver strength upon each power-on. A different and corresponding failure region may be loaded into the logic. This dynamic component further complicates the prospect of reverse engineering an integrated circuit.

Figure 1:
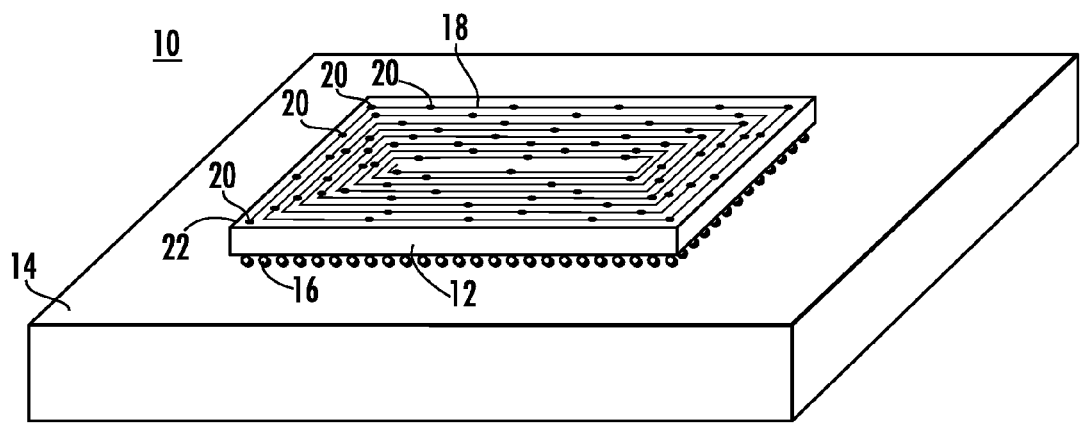
FIG. 1 shows an integrated circuit assembly having a conductive element and staggered signal detection circuitry configured to detect and impede a reverse engineering procedure.

FIG. 1 shows an integrated circuit assembly 10 having a conductive element and staggered signal detection circuitry configured to detect and impede a reverse engineering procedure of a microchip 12. The assembly 10 more particularly shows a flip chip integrated circuit structure. Flip chip mounting typically uses die bumps 16, e.g., solder, instead of wirebonds. The die bumps 16 are typically deposited on the microchip pads, which are located on the top side of the wafer during the final wafer processing step. In order to mount the microchip to external circuitry (on a circuit board or another wafer or a microchip), the microchip is flipped around so that the topside faces down the mounting area. The die bumps 16 may be used to connect directly to the associated external circuitry. The microchip carrier 14 generally comprises the package in which the microchip 12 is mounted for plugging into (socket mount) or soldering onto (surface mount) a printed circuit board. Other embodiments consistent with the invention may include wirebond connections and associated processes.

The integrated circuit assembly 10 shown in FIG. 1 includes a conductive element 18. As shown in FIG. 1, the conductive element 18 comprises a coiled, metal, conductive path. Such a metal path may comprise copper or virtually any other conductive material. In other embodiments, the conductive element 18 may comprise a substance other than metal. Where desired, the conductive element 18 may include adequate density for shielding.

The conductive element 18 may be fashioned in any conventional manner and in any shape or configuration. For instance, a suitable conductive element of another embodiment may include a planar layer, as opposed to a wire path. Microchips consistent with the underlying principals of the present invention may include multiple such conductive elements, whether interconnected or independently wired. As shown in the embodiment of FIG. 1, the conductive element 18 is incorporated within the microchip 12. Other embodiments may alternatively and/or additionally position a conductive element 18 elsewhere within an integrated circuit assembly 10 such that the placement of the conductive element 18 is such that it may interfere with a grinding or other reverse engineering process.

The conductive element 18 may include multiple connections 20, e.g., through-silicon or other vias. A through-silicon via is a type of via that generally comprises a vertical electrical connection passing through a silicon wafer or die for the purpose of creating three-dimensional packages and circuits. The connections 20 may connect points along the conductive element 18 to on-chip receivers (not shown). A transmitter 22 in communication with the conductive element 18 may inject a pulse or other signal into the conductive element 18. The signal may be received and registered along the connections 20 of the conductive element 18 as the signal propagates through the conductive element 18.

A portion of the conductive element 18 may correspond to a point or region where the magnitude or other property of the signal has become altered by virtue of its travel through the conductive element 18 to a point where the alteration triggers an event. For instance, the voltage or current level may degrade predictably as the signal travels through a copper coil comprising the conductive element 18. Another example of a detectable signal quality measurement may include noise.

Figure 2:
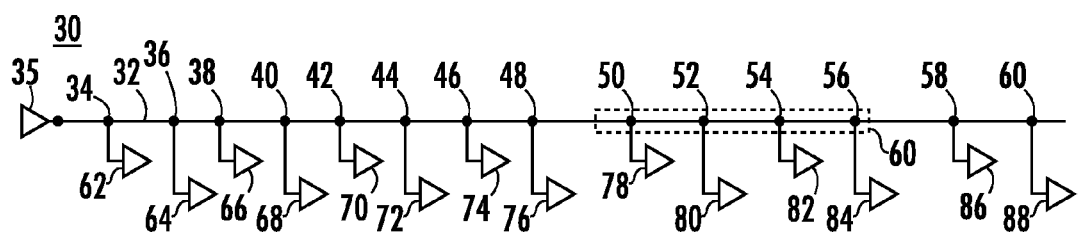
FIG. 2 shows a conductive element such as may have application within the integrated circuit assembly of FIG. 1, along with a plurality of connections and a transmitter configured to transmit a pulse into the conductive element.

FIG. 2 shows a conductive element 30 such as may have application within the integrated circuit assembly 10 of FIG. 1. The conductive element 30 may include an elongated wire 32 and a plurality of vias or other connections 34, 36, 38, 40, 42, 44, 46, 48, 50, 52, 54, 56, 58 and 60. The conductive element 30 may also include a transmitter 35 configured to transmit a pulse into the wire 32.

Each connection 34, 36, 38, 40, 42, 44, 46, 48, 50, 52, 54, 56, 58 and 60 may connect (respectively, where appropriate) to one or more receivers 62, 64, 66, 68 70, 72, 74, 76, 78, 80, 82, 84, 86 and 88. Each receiver 62, 64, 66, 68 70, 72, 74, 76, 78, 80, 82, 84, 86 and 88, in turn, may connect to other logic circuitry configured to sense each receiver output and compare it to an expected result. Such an expected result may correspond to predicted signal failure area 60 along the conductive element 30. As shown in FIG. 2, the failure area 60 corresponds to connections 50, 52, 54, 56 along the signal propagation path. The failure area 60 includes a point or range where signal quality has become inadequate.

Outputs corresponding to the applicable receivers 78, 80, 82, 84 may change relative to that output of a proceeding receiver 76, where the signal strength was detectible or otherwise sufficient. As such, a comparison may be conducted automatically to ensure that the expected magnitude or other attribute of the signal is detected within the expected range corresponding to the area 60, or alternatively, at an expected point.

Figure 3:
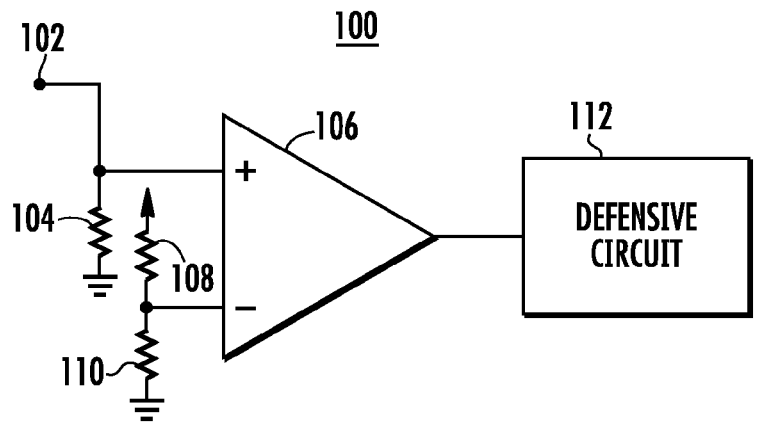
FIG. 3 shows an exemplary detection and defensive circuit as may have application in receiving outputs from the receivers of FIG. 2 to determine signal magnitude, and where appropriate, to initiate an action intended to impede a reverse engineering effort.

FIG. 3 shows and exemplary detection and defensive circuit 100 as may have application in receiving outputs from the receivers 62, 64, 66, 68 70, 72, 74, 76, 78, 80, 82, 84, 86 and 88 of FIG. 2 for determining a signal failure, and where appropriate, initiating an action intended to impede a reverse engineering effort. Turning more particularly to the detection and defensive circuit 100, an input may be received at node 102. A voltage present at the node 102 may be connected to both a grounded resistor 104 and an input prong of a comparator 106. A voltage divider comprising resistors 108, 110 of known quantities may feed the other input prong of the comparator 106.

Where the input voltage fails to exceed a setting established by the resistors 108, 110, the comparator 106 may output a signal to a defensive circuit 112. Such a scenario may exist where a signal voltage communicated from a conductive element 18 at a via connection 20 has a relatively low voltage magnitude due to signal propagation loses. The defensive circuit 112 may in response initiate a self-destruct, spoofing or other obscuring action in response to the comparator's output.

Figure 4:
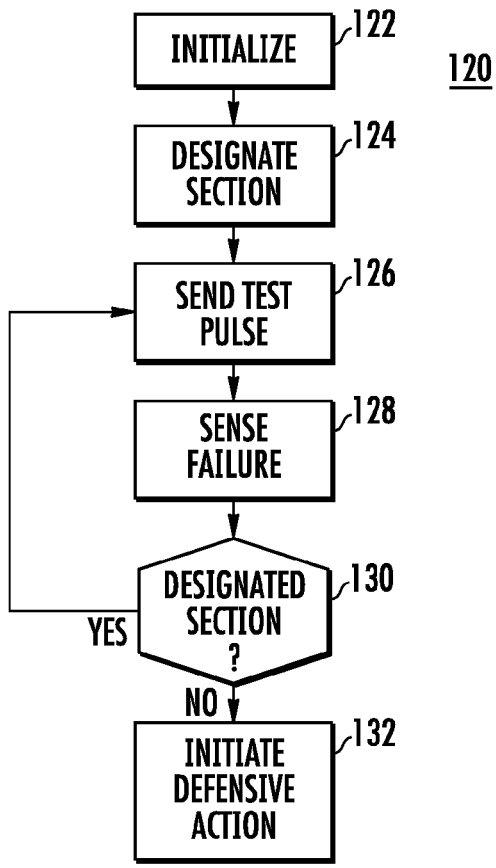
FIG. 4 shows a flowchart having steps executable by the integrated circuit assembly of FIG. 1 for determining that a tampering effort is underway from signal propagation characteristics associated with the conductive element.

FIG. 4 is a flowchart 120 having steps executable by the integrated circuit assembly 10 of FIG. 1 for determining from signal propagation characteristics associated with a conductive element 18 of a microchip 12 that a tampering effort is underway. At block 122 of FIG. 4, processes consistent with an embodiment of the invention may initialize. Such initialization processes at block 122 may include readying registers for selecting and storing location information identifying an area 60 at block 124. The designated area 60 may correspond to a location along the conductive element 30 at which a signal failure is expected to occur.

A transmitter 35 of the integrated circuit assembly 10 may send at block 126 a test pulse. The pulse may propagate through the conductive element 18. One or more receivers 76, 80, 82, 84 may detect at block 128 a signal failure. Processes of the microchip 12 may determine at block 130 that the point 60 of the detected failure corresponds to the section designated at block 124. If so, then the embodiment of FIG. 4 may continue to monitor for failures by transmitting and receiving additional pulses at block 126.

Alternatively, where the failure occurs in an unexpected section of the conductive element 18 at block 130, then the integrated circuit 10 may initiate at block 122 a defensive action. Namely, the defensive circuit 112 may initiate a self-destruct, shut-down, spoofing or other action intended to frustrate an exploitation attempt.

While the invention has and hereinafter will be described in the context of integrated circuit assemblies, those skilled in the art will appreciate that the various embodiments of the invention are capable of being distributed as a program product in a variety of forms, and that the invention applies equally regardless of the particular type of computer readable, signal bearing media used to actually carry out the distribution. For instance, a separate processor incorporated within or otherwise in communication with an integrated circuit assembly may access memory to execute program code functions to identify tampering in a software manner that is consistent with the underlying principles of the present invention. Examples of signal bearing, computer readable media include, but are not limited to tangible, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In general, the routines executed to implement the embodiments of the invention, whether implemented in hardware, as part of an integrated circuit assembly, or as a specific application, component, program, engine, process, programmatic tool, object, module or sequence of instructions, or even a subset thereof, may be referred to herein as an "algorithm," "function," "program code," or simply "program." Program code typically comprises one or more instructions that are resident at various times in various memory and storage devices in a computing system. When read and executed by one or more processors, the program code performs the steps necessary to execute steps or elements embodying the various aspects of the invention. One of skill in the art should appreciate that embodiments consistent with the principles of the present invention may nonetheless use program code resident at only one, or any number of locations.

Those skilled in the art will further recognize that the exemplary environments illustrated in FIGS. 1-4 are not intended to limit the present invention. For instance, while flip chip mounting processes are used in many of the embodiments above for exemplary purposes, embodiments of the invention may have equal applicability to microchip assemblies associated with virtually any other mounting technique. Indeed, those skilled in the art will recognize that other alternative hardware and/or software environments may be used without departing from the scope of the invention.

Moreover, while the present invention has been illustrated by a description of various embodiments and while these embodiments have been described in considerable detail, it is not the intention of the Applicants to restrict, or in any way limit the scope of the appended claims to such detail. The invention in its broader aspects is therefore not limited to the specific details, representative apparatus and method, and illustrative example shown and described. Accordingly, departures may be made from such details without departing from the spirit or scope of Applicants' general inventive concept.

What is claimed is:

1. An apparatus comprising:
   a conductive element proximate security sensitive circuitry of a microchip, wherein the conductive element conducts an electrical signal that predictably weakens as it propagates through the conductive element; and
   circuitry comprising a plurality of sensors in electrical communication with respective points of the conductive element, wherein the circuitry selects one of the plurality of sensors, and initiates an action for obstructing analysis of the security sensitive circuitry in response to the predictable weakening of the electrical signal proximate the selected one of the plurality of sensors, wherein a first characteristic of the electrical signal sensed at the selected sensor is stronger than a second characteristic of the electrical signal sensed at a second sensor of the plurality, and wherein the first and second characteristics match first and second expected levels, respectively.

2. The apparatus of claim 1, wherein the circuitry detects the predictable weakening of the electrical signal that initiates an action for obstructing analysis of the security sensitive circuitry.

3. The apparatus of claim 1, wherein the electrical signal predictably weakens at different regions along the conductive element according to a variable signal strength of the electrical signal, wherein the regions correspond to subsets of the plurality of sensors.

4. The apparatus of claim 3, wherein the circuitry automatically varies the signal strength of the electrical signal.

5. The apparatus of claim 1 further comprising a signal transmitter to transmit the electrical signal to the conductive element.

6. The apparatus of claim 1 further comprising a connection between the sensor and the conductive element.

7. The apparatus of claim 6, wherein the connection comprises a through-silicon via.

8. The apparatus of claim 1, wherein the electrical signal predictably cannot be sensed proximate the selected one of the plurality of sensors.

9. The apparatus of claim 1, wherein the electrical signal predictably weakens within a range along the plurality of sensors.

10. The apparatus of claim 1, further comprising program code executed by the circuitry to initiate an action for obstructing analysis of the security sensitive circuitry in response to the predictable weakening of the electrical signal.

11. The apparatus of claim 1, wherein the conductive element comprises a metallic coil.

12. The apparatus of claim 1, wherein the conductive element comprises a metallic path.

13. The apparatus of claim 1, wherein the conductive element comprises a metallic plate.

14. The apparatus of claim 10, wherein the action includes an operation selected from a group consisting of at least one of: a shutdown, a spoofing and a self-destruct operation.

15. An apparatus comprising:
   a conductive element proximate security sensitive circuitry of a microchip, wherein the conductive element conducts an electrical signal, wherein the electrical signal predictably weakens as it propagates through the conductive element according to a strength of the electronic signal; and
   circuitry comprising a plurality of sensors in electrical communication with respective points of the conductive element, wherein the circuitry selects one of the plurality sensors, sets a strength of the electronic signal, and initiates an action for obstructing analysis of the security sensitive circuitry in response to the electronic signal predictably weakening proximate the selected one of the plurality of sensors, wherein a first characteristic of the electrical signal sensed at the selected sensor is stronger than a second characteristic of the electrical signal sensed at a second sensor of the plurality, and wherein the first and second characteristics match first and second expected levels, respectively.

16. A method of protecting security sensitive circuitry of a microchip from undesired analysis, the method comprising:
   selecting one of a plurality of sensors in electrical communication with respective points of a conductive element;
   sensing at the selected sensor an unexpected weakening of an electronic signal propagating through the conductive element proximate security sensitive circuitry of the microchip; and
   initiating an action configured to obstruct analysis of the security sensitive circuitry in response to sensing the unexpected weakening of the electronic signal, wherein a first characteristic of the electrical signal sensed at the selected sensor is stronger than a second characteristic of the electrical signal sensed at a second sensor of the plurality, and wherein the first and second characteristics match first and second expected levels, respectively.

17. The method of claim 16, wherein sensing the unexpected weakening further comprises determining that the electrical signal cannot be sensed at the selected sensor.

18. The method of claim 16 further comprising varying a strength of the electronic signal to vary an area of the conductive element at which the electronic signal is expected to weaken.

19. The apparatus of claim 1, wherein the conductive element is integrated in the microchip.

* * * * *